United States Patent
Ma et al.

(10) Patent No.: US 11,900,618 B2
(45) Date of Patent: Feb. 13, 2024

(54) SYSTEM AND METHOD FOR DETECTING MOVING TARGET BASED ON MULTI-FRAME POINT CLOUD

(71) Applicant: ZHEJIANG LAB, Zhejiang (CN)

(72) Inventors: Yechi Ma, Hangzhou (CN); Wei Hua, Hangzhou (CN); Quan Feng, Hangzhou (CN); Shun Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/338,328

(22) Filed: Jun. 20, 2023

(65) Prior Publication Data

US 2023/0351618 A1    Nov. 2, 2023

Related U.S. Application Data

(63) Continuation of application No. PCT/CN2022/098356, filed on Jun. 13, 2022.

(30) Foreign Application Priority Data

Dec. 2, 2021    (CN) .......................... 202111456208.0

(51) Int. Cl.
G06T 7/246    (2017.01)

(52) U.S. Cl.
CPC .... *G06T 7/251* (2017.01); *G06T 2207/10028* (2013.01); *G06T 2207/20081* (2013.01); *G06T 2207/20084* (2013.01)

(58) Field of Classification Search
CPC ........... G06T 7/251; G06T 2207/10028; G06T 2207/20081; G06T 2207/20084
USPC ....................................................... 702/150
See application file for complete search history.

(56) References Cited

U.S. PATENT DOCUMENTS 10,970,518 B1 *    4/2021    Zhou ......................... G06T 7/73
2019/0080210 A1    3/2019    Owechko

FOREIGN PATENT DOCUMENTS

| CN | 111429514 A | 7/2020 |
| CN | 112731339 A | 4/2021 |
| CN | 113379709 A | 9/2021 |
| CN | 113870318 A | 12/2021 |

OTHER PUBLICATIONS

International Search Report (PCT/CN2022/098356); dated Sep. 14, 2022.
Two-Leve-Progressive-Attention-Convolutional-Network-for-Fine-Grained-Image-Recognition.

* cited by examiner

*Primary Examiner* — Aditya S Bhat
(74) *Attorney, Agent, or Firm* — W&G Law Group (57) ABSTRACT

A system and a method for detecting a moving target based on multi-frame point clouds. The system comprises a voxel feature extraction module; a transformer module used for matching and fusing the feature tensor sequence, fusing a first feature tensor with a second feature tensor, fusing the fused result with a third feature tensor, fusing the fused result with a fourth feature tensor, and repeating the fusing steps with a next feature tensor to obtain a final fused feature tensor; and an identification module used for extracting features from the final fused feature tensor and outputting detection information of a target. The method comprises the following steps: S1, constructing each system module; S2, training the model by the data in a training set; S3, predicting by the trained model.

9 Claims, 4 Drawing Sheets

SYSTEM AND METHOD FOR DETECTING MOVING TARGET BASED ON MULTI-FRAME POINT CLOUD

CROSS-REFERENCE TO RELATED APPLICATIONS

The present application is a continuation of International Application No. PCT/CN2022/098356, filed on Jun. 13, 2022, which claims priority to Chinese Application No. 202111456208.0, filed on Dec. 2, 2021, the contents of both of which are incorporated herein by reference in their entireties.

TECHNICAL FIELD

The present disclosure relates to the technical field of three-dimensional target detection, in particular to a system and a method for detecting a moving target based on multi-frame point clouds.

BACKGROUND

At present, the autonomous driving technology is being used more and more widely, and the sensing technology, especially the three-dimensional target detection technology based on point clouds, is one of the most important tasks in the autonomous driving technology. Currently, the three-dimensional target detection technology based on point clouds with a good effect includes the following literatures: "Sparsely Embedded Convolutional Detection", "3D Object Proposal Generation and Detection from Point Cloud", and patents "Three-dimensional target detection system based on laser point cloud and detection method thereof", "Three-dimensional target detection method based on point cloud", etc. However, the above prior art has the following problems: firstly, the above methods do not take continuous frame point cloud data into consideration, which not only fails to predict the target trajectory, but also affects the detection accuracy of the target; secondly, the above methods completely rely on the inherent categories in the training data set, that is, when there are categories that are not present in the training set in an actual scenario, a phenomenon of missing detection of targets may occur.

SUMMARY

In order to solve the shortcomings of the prior art, the present disclosure takes multi-frame point cloud data into consideration, and does not strongly depend on the categories in the training set target for the detection of moving targets, thus achieving the purposes of predicting the target trajectory, improving the detection accuracy and avoiding missing detection. The present disclosure is implemented by the following technical solutions.

A system for detecting a moving target based on multi-frame point clouds includes a voxel feature extraction module, a transformer module and an identification module; the transformer module includes a cross-modal attention module.

The voxel feature extraction module is used to voxelize a continuous frame point cloud sequence {Pointcloud[i], $0<i<=N$} and extract a feature tensor sequence {F_Base[i], $0<i<=N$}, where i represents the frame index and N represents the number of frames.

The transformer module is used to acquire the feature tensor sequence {F_Base[i],$0<i<=N$}, fuse a first feature tensor with a second feature tensor by the cross-modal attention module, fuse a fused result with a third feature tensor, fuse a fused result with a fourth feature tensor, and repeat the fusing steps with a next feature tensor until the last features tensor is fused, to obtain a final fused feature tensor F_Base_fusion_seq[N−1,N].

The cross-modal attention module is used to match and fuse two feature tensors according to an attention mechanism, and obtain a fused feature tensor by convolution neural network fusion.

The identification module is used to extract features from the final fused feature tensor F_Base_fusion_seq[N−1,N] and output detection information of a target.

Further, the voxel feature extraction module transforms the continuous frame point cloud sequence {Pointcloud[i], $0<i<=N$} into a geodetic coordinate system C_Base according to a pose {Pose[i],$0<i<=N$} corresponding to each frame, and voxelizes the transformed continuous frame point cloud sequence {Pointcloud_Base[i],$0<i<=N$}; the geodetic coordinate system C_Base is a Cartesian orthogonal coordinate system with a fixed preset coordinate origin relative to the earth, with a forward direction of a first frame point cloud data being a positive direction of an X axis of the geodetic coordinate system C_Base, a right direction being a positive direction of a Y axis of the geodetic coordinate system C_Base, and an upward direction being a positive direction of a Z axis of the geodetic coordinate system C_Base.

Further, the voxelization takes an average value of all points in each voxel as a voxelization feature by constructing a voxel size and a voxelization range. The size of a voxelization feature is $C*(D*W*H)$, where C represents the number of feature channels, D represents a height, W represents a width and H represents a length.

Further, the feature tensor extraction is to extract features from a feature sequence {Voxel_Base[i], $0<i<=N$} obtained by voxelization by a three-dimensional sparse convolution module to obtain a feature tensor sequence {F_Base[i], $0<i<=N$}; the three-dimensional sparse convolution module includes a group of sub-convolution modules, and each sub-convolution module includes a three-dimensional sub-popular convolution layer, a normalization layer and a Relu layer.

Further, the transformer module reshapes a feature tensor F_Base[i] with a size of $C*D*W*H$ into a feature tensor F_Base_seq[i] with the size of $C*(D*W*H)$, where C represents a number of feature channels, D represents a height, W represents a width and H represents a length, and then matches and fuses the reshaped feature tensor sequence {F_Base_seq[i], $0<i<=N$}.

Further, the feature tensor sequence is {F_Base_seq[i], $0<i<=N$}, where i represents a frame index and N represents a number of frames; the feature tensors in the sequence are matched and fused to obtain a fused feature tensor F_Base_fusion_seq[j,j+1], where j represents a frame index, $0<j<=N$; when j=1, a feature tensor F_Base_seq[j] and a feature tensor F_Base_seq[j+1]are fused; when $1<j<N$, a fused feature tensor F_Base_fusion_seq[j−1,j] and a feature tensor F_Base_seq[j+1] are loop-fused, and a final fused feature tensor F_Base_fusion_seq[N−1,N] is output. In the related art, loop fusion means: if the number of the frames is N, fusing the zeroth frame with the first frame; then fusing the fusion result of the zeroth and the first frames with the second frame, and then fusing the above fusion result with the third frame; . . . ; repeating the above steps and finally obtaining the final fusion result.

Further, the matching and fusion of the cross-modal attention module is as follows:

$$Y(X\_a, X\_b) = \text{softmax\_col}\left(\frac{Q\_a * \text{Trans}(K\_b)}{d}\right) * V\_b$$

$$Y(X\_b, X\_a) = \text{softmax\_col}\left(\frac{Q\_b * \text{Trans}(K\_a)}{d}\right) * V\_a$$

where Q_a=X_a*W_Q and Q_b=X_b*W_Q respectively represent Query in the attention mechanism; K_a=X_a*W_K and K_b=X_b*W_K respectively represent Key in the attention mechanism; V_a=X_a*W_V and V_b=X_b*W_V respectively represent Value in the attention mechanism; X_a and X_b represent two feature tensors to be fused; W_Q, W_K and W_V respectively represent trainable weight matrices; d represents the dimensions of Q_a and K_b and Q_b and K_a respectively; Trans ( ) represents a matrix transposition operation; and softmax_col ( ) represents a matrix normalization operation by column;

Then, Y(X_a, X_b) and Y(X_b, X_a) are fused by a convolutional neural network, and the fused feature tensor is obtained:

Crossmodal Attention(X_a,X_b)=Conv(Y(X_a, X_b),Y(X_b, X_a)) where Conv ( ) represents the convolutional neural network.

Further, the recognition module reshapes the final fused feature tensor F_Base_fusion_seq[N−1,N] into a feature tensor F_Base_fusion with a size of (C*D)*W*H, and then extracts features from the reshaped feature tensor to output the detection information of the target.

Further, the identification module respectively obtains a three-dimensional coordinate hm of a center point of the target in the geodetic coordinate system C_Base, a moving direction diret of the center point of the target, an offset of the center point of the target, a predicted trajectory of the enter point of the target, length, width and height dim of the target, and an altitude z of the target and category information of the target by a group of two-dimensional convolutional neural networks; in a training stage, a Focal_loss function is used to detect the three-dimensional coordinate of the center point of the target; for the detection of the moving direction of the center point of the target, a sine value and a cosine value thereof are regressed, and L1_loss function is used; a L1_Loss function is used for regression of the offset of the center point of the target; the L1_Loss function is used for regression of the predicted trajectory of the center point of the target; and a SmothL1_loss function is used for regression of the length, width and height and the altitude (the coordinate in the Z axis) of the target; different weights are assigned to losses of different detection branches, and finally a trained model is obtained.

A method for detecting a moving target based on multi-frame point clouds includes the following steps:

S1, constructing a voxel feature extraction module, a transformer module, a recognition module and a cross-modal attention module.

S2, training the models by data in a training set.

S3, predicting by trained models.

The present disclosure has the following advantages and beneficial effects:

According to the present disclosure, the motion state of a target is judged by a multi-frame integration mechanism, so as to judge the motion mode adopted by the target, such as two-wheel motion, four-wheel motion, two-footed motion, four-footed motion and the like; when there are only two categories of people and cars in the training data set while a target category of truck appears in the actual prediction, the target can still be identified as having a four-wheel movement by multi-frame of information, which does not depend on the inherent categories in the training data set and thus improves the detection accuracy and avoids the phenomenon of missing detection of the target.

DESCRIPTION OF EMBODIMENTS

Hereinafter, specific embodiments of the present disclosure will be described in detail with reference to the drawings. It shall be understood that the specific embodiments described here are only used to illustrate and explain the present disclosure, and are not used to limit the present disclosure.

In an embodiment of the present disclosure, a kitti data set is used. The data group of this embodiment includes 5000 pieces of continuous frame point cloud data with a length of 10, the pose of the laser radar of a point cloud acquisition device and the three-dimensional information tag of the target, among which 4000 pieces of data are training sets and 1000 pieces of data are verification sets.

Figure 1:
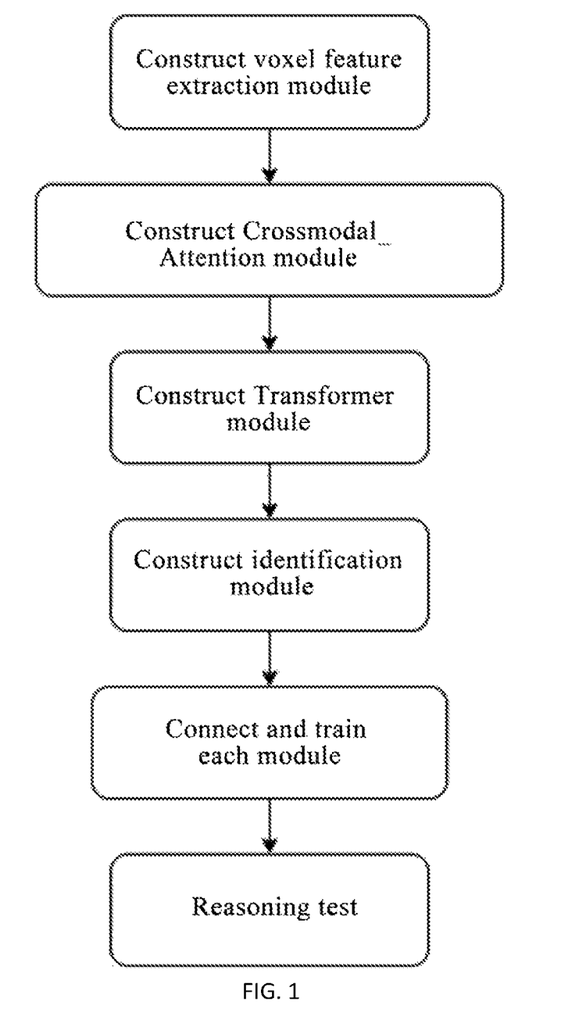
FIG. 1 is a flow chart of the method according to the present disclosure.

As shown in FIG. 1, a method for detecting a moving target based on multi-frame point clouds includes the following steps.

In step 1, a voxel feature extraction module is constructed firstly.

A continuous frame point cloud sequence {Pointcloud[i]|i with a length of 10 as a frame index, 0<i<=10}, and the pose {Pose[i]|i of each frame of the laser radar sensor as a frame index, 0<i<=N}, are input.

The continuous frame point cloud sequence with a length of 10 is transformed into a C_Base coordinate system by the pose of each frame of the laser radar, and 10 new frame point cloud sequences {Pointcloud_Base[i]|i are obtained as the frame index, 0<i<=10}, where the C_Base coordinate system is Cartesian orthogonal coordinate system with a fixed preset coordinate origin relative to the earth, with a forward direction of a first frame point cloud data being a positive direction of the X axis of the C_Base coordinate system, a right direction being a positive direction of the Y axis of the C_Base coordinate system, and an upward direction being a positive direction of the Z axis of the C_Base coordinate system.

The continuous frame point cloud sequence {Pointcloud_Base[i]|i with a length of 10 as a frame index, 0<i<=10}, is voxelized, and 10 frames of the voxelized point cloud feature {Voxel_Base[i]|i, 0<i<=10}, are obtained as the frame index.

The value ranges of the voxelized point cloud feature sequence in X, Y and Z axes are [0 m, 70.4 m], [−40 m, 40 m],[−3 m, 1 m] respectively, the size of each voxel is [0.05 m, 0.05 m, 0.1 m], and each voxelized feature is the average value of all points in the voxel. The size of the voxelized feature is C*D*W*H, where C represents the number of feature channels, D represents the height, W represents the width, and H represents the length. In this embodiment, the size is 3*40*1600*1408.

Figure 2:
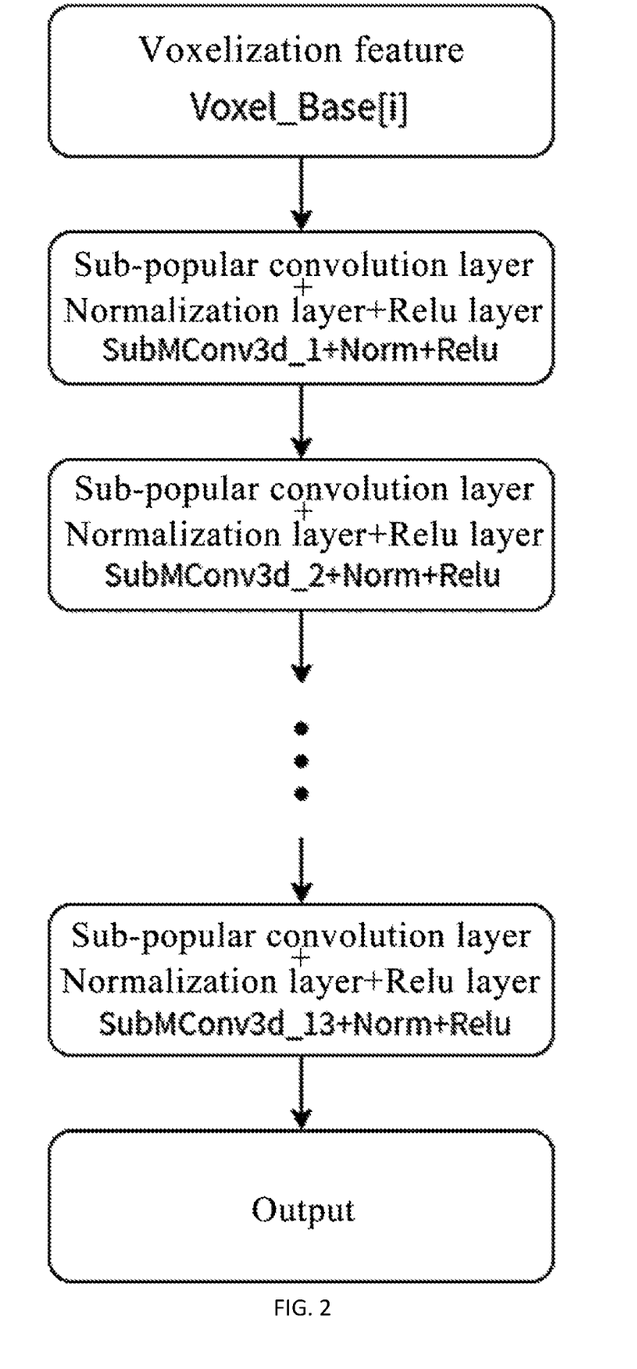
FIG. 2 is a schematic diagram of the structure of a sparse 3D_Conv network according to the present disclosure.

The voxelized feature sequence {Voxel_Base[i]|i as the frame index, 0<i<=10}, is subjected to feature extraction by a sparse 3D_Conv to obtain a feature tensor sequence {F_Base[i]|i as the frame index, 0<i<=10} with a size of 64*2*200*170. The network structure of the sparse 3D_Conv is shown in FIG. 2, including a group of sub-convolution modules, which are composed of a sub-popular convolution layer, a normalization layer and a Relu layer. The specific network parameters are shown in the following table:

| Network layer | Convolution kernel size | Stride | Padding | Number of channels | Input size | Output size |
|---|---|---|---|---|---|---|
| SubMConv3d_1 | 3*3*3 | 1*1*1 | 0*0*0 | 16 | 3*40*1600*1408 | 16*40*1600*1408 |
| Norm | / | / | / | / | / | / |
| Relu | / | / | / | / | / | / |
| SubMConv3d_2 | 3*3*3 | 1*1*1 | 0*0*0 | 16 | 16*40*1600*1408 | 16*40*1600*1408 |
| Norm | / | / | / | / | / | / |
| Relu | / | / | / | / | / | / |
| SubMConv3d_3 | 3*3*3 | 2*2*2 | 1*1*1 | 32 | 16*40*1600*1408 | 32*20*800*704 |
| Norm | / | / | / | / | / | / |
| Relu | / | / | / | / | / | / |
| SubMConv3d_4 | 3*3*3 | 1*1*1 | 0*0 | 32 | 32*20*800*704 | 32*20*800*704 |
| Norm | / | / | / | / | / | / |
| Relu | / | / | / | / | / | / |
| SubMConv3d_5 | 3*3*3 | 1*1*1 | 0*0*0 | 32 | 32*20*800*704 | 32*20*800*704 |
| Norm | / | / | / | / | / | / |
| Relu | / | / | / | / | / | / |
| SubMConv3d_6 | 3*3*3 | 2*2*2 | 1*1*1 | 64 | 32*20*800*704 | 64*10*400*352 |
| Norm | / | / | / | / | / | / |
| Relu | / | / | / | / | / | / |
| SubMConv3d_7 | 3*3*3 | 1*1*1 | 0*0*0 | 64 | 64*10*400*352 | 64*10*400*352 |
| Norm | / | / | / | / | / | / |
| Relu | / | / | / | / | / | / |
| SubMConv3d_8 | 3*3*3 | 1*1*1 | 0*0*0 | 64 | 64*10*400*352 | 64*10*400*352 |
| Norm | / | / | / | / | / | / |
| Relu | / | / | / | / | / | / |
| SubMConv3d_9 | 3*3*3 | 1*1*1 | 0*0*0 | 64 | 64*10*400*352 | 64*10*400*352 |
| Norm | / | / | / | / | / | / |
| Relu | / | / | / | / | / | / |
| SubMConv3d_10 | 3*3*3 | 2*2*2 | 1*1*1 | 64 | 64*10*400*352 | 64*5*200*176 |
| Norm | / | / | / | / | / | / |
| Relu | / | / | / | / | / | / |
| SubMConv3d_11 | 3*3*3 | 1*1*1 | 0*0*0 | 64 | 64*5*200*176 | 64*5*200*176 |
| Norm | / | / | / | / | / | / |
| Relu | / | / | / | / | / | / |
| SubMConv3d_12 | 3*3*3 | 1*1*1 | 0*0*0 | 64 | 64*5*200*176 | 64*5*200*176 |
| Norm | / | / | / | / | / | / |
| Relu | / | / | / | / | / | / |
| SubMConv3d_13 | 3*3*3 | 1*1*1 | 0*0*0 | 64 | 64*5*200*176 | 64*5*200*176 |
| Norm | / | / | / | / | / | / |
| Relu | / | / | / | / | / | / |
| SubMConv3d_14 | 3*1*1 | 2*1*1 | 0*0*0 | 64 | 64*5*200*176 | 64*2*200*176 |
| Norm | / | / | / | / | / | / |
| Relu | / | / | / | / | / | / |

F_Base[i] is the output of the voxel feature extraction module.

In step 2, a Crossmodal_Attention module is constructed.

The input is two feature tensors, i.e., X_a and X_b (the selection of tensors is set in step 3, and the step 3 is a call to the step 2).

Crossmodal Attention(X_a,X_b)=Conv(Y(X_a, X_b),Y(X_b, X_a))

$$Y(X\_a, X\_b) = \text{softmax\_col}\left(\frac{Q\_a * \text{Trans}(K\_b)}{d}\right) * V\_b$$

where Q_a=X_a*W_Q is taken as Query, K_b=X_b*W_K is taken as Key, V_b=X_b*W_V is taken as Value, and W_Q, W_K and *W_V are respectively trainable weight matrices; D is the dimension of Q_a and K_b; Trans( ) is a matrix transpose function; softmax_col( ) is a normalization operation of the matrix by column.

$$Y(X\_b, X\_a) = \text{softmax\_col}\left(\frac{Q\_b * \text{Trans}(K\_a)}{d}\right) * V\_a$$

where Q_b=X_b*W_Q is taken as Query, K_a=X_a*W_K is taken as Key, V_a=X_a*W_V is taken as Value, and d is the dimension of Q_b and K_a; softmax is to normalize the vector.

Conv ( ) is a convolutional neural network function, and Y(X_a, X_b),Y(X_b, X_a) is subjected to Concat and then fused by a 1*1 convolutional neural network. A feature tensor Crossmodal_Attention (X_a,X_b) with a size of 64*(200*176*2) is obtained.

In step 3, a transformer module is constructed.

The input is a continuous frame feature tensor sequence {F_Base[i]|i with a length of 10 as a frame index, 0<i<=10}. {F_Base[i]|i as a frame index, 0<i<=10}, is reshaped as a feature sequence F_Base_seq[i]|I with a size of 64*(2*200*176) as a frame index, 0<i<=10}.

The feature sequence {F_Base[i]|i as a frame index, 0<i<=N}, is matched and fused by Crossmodal_Attention. When j=1, F_Base_fusion_seq[j,j+1]=Crossmodal_Attention(F_Base_fusion_seq[j−1,j], F_Base_seq[j+1]), where j is a frame index, Crossmodal_Attention is a multi-frame integration module, and the feature tensor F_Base_fusion_seq[10−1,10] is the output of the Transformer module.

In step 4, an identification module is constructed.

Figure 3:
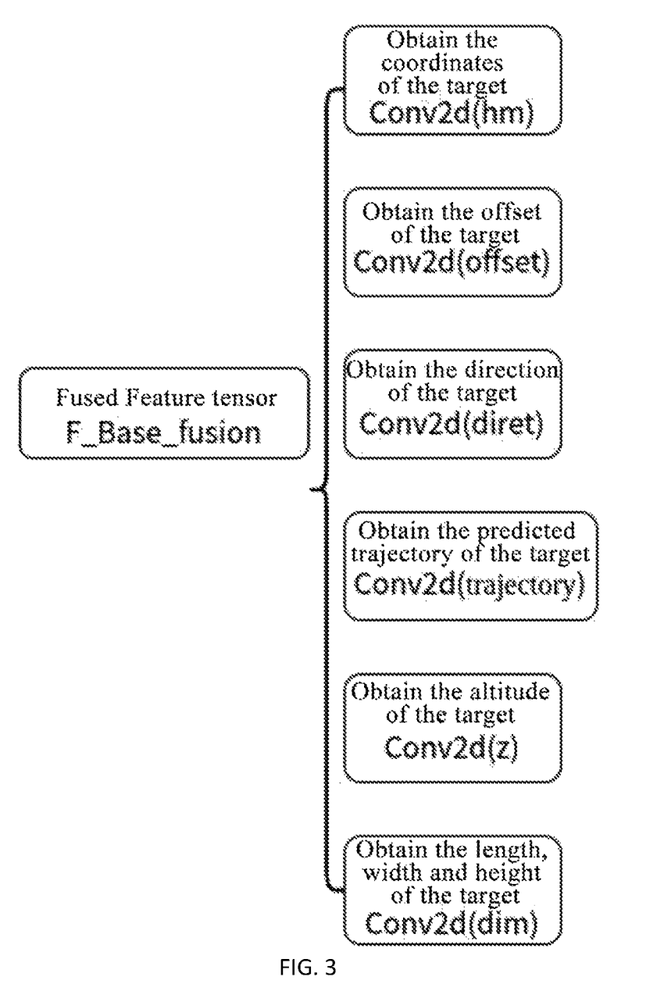
FIG. 3 is a schematic diagram of the network structure of the convolutional neural network according to the present disclosure.

The input is F_Base_fusion_seq[10−1,10], and it is reshaped into a feature tensor F_Base_fusion with a size of (C*D)*W*H, which is 128*200*176 in this embodiment. A convolution neural network is used to extract the features of the feature tensor F_Base_fusion, and the detection information of the target is output, including the three-dimensional coordinate hm of the center point of the target in the C_Base coordinate system, the length, width and height dim of the target, the movement direction diret of the center point of the target, the offset of the center point of the target, the altitude z of the target, and the category information of the target, which includes two-wheel movement, four-wheel movement, two-footed movement and four-footed movement. For kitti data, cars are categorized into four-footed movement, pedestrians into two-footed movement and cyclists into two-wheeled movement. The network structure of the convolutional neural network is shown in FIG. 3, and the specific network parameters are shown in the following table:

| Network layer | Convolution kernel size | Stride | Padding | Number of channels | Input size | Output size |
|---|---|---|---|---|---|---|
| Conv2d(hm) | 3*3 | 1*1*1 | 0*0*0 | 64 | 128*200*176 | 4*200*176 |
| Conv2d(offset) | 3*3 | 1*1*1 | 0*0*0 | 64 | 128*200*176 | 2*200*176 |
| Conv2d(diret) | 3*3 | 1*1*1 | 0*0*0 | 64 | 128*200*176 | 2*200*176 |
| Conv2d(z) | 3*3 | 1*1*1 | 0*0*0 | 64 | 128*200*176 | 2*200*176 |
| Conv2d(dim) | 3*3 | 1*1*1 | 0*0*0 | 64 | 128*200*176 | 3*200*176 |

Figure 4:
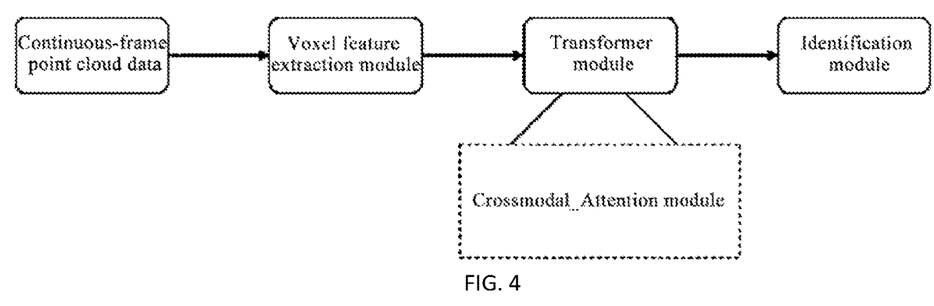
FIG. 4 is a schematic diagram of the structure of the system according to the present disclosure.

In step 5, as shown in FIG. 4, the modules are connected and trained.

The neural network is trained with the data in the kitti training set, in which a Focal_loss loss function is used for detecting the center point of the target; a sine value and a cosine value are regressed for detecting the moving direction of the center point of the target, and a L1_loss function is used; a L1_Loss function is used for regression of the offset of the center point of the target; and a SmothL1_loss loss function is used for regression of the length, width, height and Z-axis coordinate of the target. Different weights are assigned to the losses of different detection branches. Finally, a trained model is obtained.

In step 6, reasoning test is carried out.

The trained model is loaded, and the reasoning test of the neural network is carried out by using the data in a kitti verification set.

The system and method for detecting a moving target based on multi-frame point clouds in the embodiment of the present disclosure are compared with the popular three-dimensional target detection solutions based on pure point clouds, such as PointPillars, PointRCNN and Second. With the same training set and model parameter optimization method, the 3D map comparison of various indicators in the verification set is as shown in the following table:

|  | Vehicles | Pedestrians | Cyclist |
|---|---|---|---|
| PointPillars | 89.65372 | 72.65376 | 86.88952 |
| PointRCNN | 94.78256 | 73.66579 | 88.63552 |
| Second | 93.37265 | 73.22698 | 88.98336 |
| Ours | 97.34768 | 80.45791 | 92.36704 |

As can be seen from the above table, compared with the existing mainstream methods, the three-dimensional target detection accuracy is greatly improved, and the overall efficiency of the present disclosure is only reduced by 15 ms, thus ensuring the real-time performance of three-dimensional target detection.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The above embodiment is only intended to illustrate, rather than to limit the technical solution of the present disclosure. Although the present disclosure has been described in detail with reference to the above embodiment, it should be understood by those skilled in the art that the technical solution described in the foregoing embodiment can still be modified, or some or all of its technical features can be replaced by equivalents; however, these modifications or substitutions do not make the essence of the corresponding technical solution deviate from the scope of the technical solution of the embodiment of the present disclosure.

What is claimed is:

1. A system for detecting a moving target based on multi-frame point clouds, comprising:
   a voxel feature extraction module,
   a transformer module comprising a cross-modal attention module, and
   an identification module,
   wherein the voxel feature extraction module is configured to voxelize a continuous frame point cloud sequence and extract a feature tensor sequence;
   wherein the transformer module is configured to:
      acquire the feature tensor sequence,
      fuse a first feature tensor with a second feature tensor by the cross-modal attention module,
      fuse a fused result of the first feature tensor and the second feature tensor, with a third feature tensor,
      fuse a fused result of the fused result of the first feature tensor and the second feature tensor, and a third feature tensor, with a fourth feature tensor, and
      repeat the fusing steps with a next feature tensor, until a last feature tensor is fused, to obtain a final fused feature tensor;
   wherein the cross-modal attention module is configured to:
      match and fuse two feature tensors according to an attention mechanism to obtain a fused feature tensor by convolution neural network fusion;
      wherein the identification module is configured to extract features from the final fused feature tensor and output detection information of a target; and
      wherein the matching and fusion of the cross-modal attention module is as follows:

$$Y(X\_a, X\_b) = \text{softmax\_col}\left(\frac{Q\_a * \text{Trans}(K\_b)}{d}\right) * V\_b$$

$$Y(X\_b, X\_a) = \text{softmax\_col}\left(\frac{Q\_b * \text{Trans}(K\_a)}{d}\right) * V\_a$$

where Q_a=X_a*W_Q and Q_b=X_b*W_Q represent Query in the attention mechanism, respectively; K_a=X_a*W_K and K_b=X_b*W_K represent Key in the attention mechanism, respectively; V_a=X_a*W_V and V_b=X_b*W_V represent Value in the attention mechanism, respectively; X_a and X_b represent two feature tensors to be fused, respectively; W_Q, W_K and W_V represent trainable weight matrices, respectively; d represents the dimensions of Q_a and K_b and Q_b and K_a, respectively; Trans( ) represents a matrix transposition operation; and softmax_col( ) represents a matrix normalization operation by column; and
   fuse Y(X_a, X_b) and Y(X_b, X_a) by a convolutional neural network to obtain the fused feature tensor:
   Crossmodal Attention(X_a,X_b)=Conv(Y(X_a, X_b), Y(X_b, X_a))
   where Conv ( ) represents the convolutional neural network.

2. The system for detecting the moving target based on multi-frame point clouds according to claim 1, wherein the voxel feature extraction module transforms the continuous frame point cloud sequence into a geodetic coordinate system according to a pose corresponding to each frame, and voxelizes the transformed continuous frame point cloud sequence, wherein the geodetic coordinate system is a Cartesian orthogonal coordinate system with a fixed preset coordinate origin relative to the earth, with a forward direction of a first frame point cloud data being a positive direction of an X axis of the geodetic coordinate system, a right direction being a positive direction of a Y axis of the geodetic coordinate system, and an upward direction being a positive direction of a Z axis of the geodetic coordinate system.

3. The system for detecting the moving target based on multi-frame point clouds according to claim 1, wherein the voxelization takes an average value of points in each voxel as a voxelization feature by constructing a voxel size and a voxelization range.

4. The system for detecting the moving target based on multi-frame point clouds according to claim 1, wherein the feature tensor extraction is to extract features from the features obtained by voxelization by a sparse convolution module to obtain feature tensors; the sparse convolution module comprises a group of sub-convolution modules, and each sub-convolution module comprises a sub-popular convolution layer, a normalization layer and a Relu layer.

5. The system for detecting the moving target based on multi-frame point clouds according to claim 1, wherein the transformer module reshapes a feature tensor with a size of C*D*W*H into a feature tensor with a size of C*(D*W*H), where C represents a number of feature channels, D represents a height, W represents a width and H represents a length, and matches and fuses the reshaped feature tensor sequence.

6. The system for detecting the moving target based on multi-frame point clouds according to claim 5, wherein the recognition module reshapes the final fused feature tensor into a feature tensor with a size of (C*D)*W*H, and extracts features from the reshaped feature tensor to output the detection information of the target.

7. The system for detecting the moving target based on multi-frame point clouds according to claim 1, wherein the feature tensor sequence is $\{F\_Base\_seq[i], 0<i<=N\}$, where i represents a frame index and N represents a number of frames; the feature tensors in the sequence are matched and fused to obtain a fused feature tensor $F\_Base\_fusion\_seq[j, j+1]$, where j represents a frame index, $0<j<=N$, and when $j=1$, a feature tensor $F\_Base\_seq[j]$ and a feature tensor $F\_Base\_seq[j+1]$ are fused; when $1<j<N$, a fused feature tensor $F\_Base\_fusion\_seq[j-1,j]$ and a feature tensor $F\_Base\_seq[j+1]$ are loop-fused, and a final fused feature tensor $F\_Base\_fusion\_seq[N-1,N]$ is output.

8. The system for detecting the moving target based on multi-frame point clouds according to claim 1, wherein the identification module obtains a coordinate of a center point of the target, a moving direction of the center point of the target, an offset of the center point of the target, a length, a width and a height of the target, and an altitude of the target and category information of the target, respectively, by a group of convolutional neural networks; and wherein in a training stage, the coordinate of the center point of the target is detected using a Focal loss function; the moving direction of the center point of the target is detected using a L1_loss function to regress a sine value and a cosine value of the moving direction of the center point of the target; the offset of the center point of the target is regressed using the L1_Loss function; a predicted trajectory of the center point of the target is regressed using the L1_Loss function; and the length, the width, the height and the altitude of the target are regressed using a SmothL1_loss function, wherein different weights are assigned to losses of different detection branches, and finally a trained model is obtained.

9. A target detection method using the system for detecting the moving target based on multi-frame point clouds according to claim 1, comprising:

step S1, constructing the voxel feature extraction module, the transformer module, the recognition module and a cross-modal attention module;

step S2, training models by data of a training set; and step S3, predicting by the trained models.

* * * * *